United States Patent
Chiang et al.

(10) Patent No.: US 9,792,486 B2
(45) Date of Patent: Oct. 17, 2017

(54) FAKE FINGER DISCRIMINATION DEVICE AND METHOD

(71) Applicant: EGIS TECHNOLOGY INC., Taipei (TW)

(72) Inventors: Yuan-Lin Chiang, Taipei (TW); Jung-Chien Lee, Taipei (TW)

(73) Assignee: Egis Technology Inc., Taipei (TW)

( * ) Notice: Subject to any disclaimer, the term of this patent is extended or adjusted under 35 U.S.C. 154(b) by 90 days.

(21) Appl. No.: 14/334,064

(22) Filed: Jul. 17, 2014

(65) Prior Publication Data

US 2015/0169931 A1    Jun. 18, 2015

(30) Foreign Application Priority Data

Dec. 17, 2013  (TW) .............................. 102146506 A

(51) Int. Cl.
G06K 9/00 (2006.01)
G06F 21/32 (2013.01)

(52) U.S. Cl.
CPC ............ *G06K 9/0012* (2013.01); *G06F 21/32* (2013.01); *G06K 9/00006* (2013.01); *G06K 9/00885* (2013.01)

(58) Field of Classification Search
CPC ............ G06K 9/0012; G06K 9/00006; G06K 9/00885; G06F 21/32; H04L 2209/16; H04L 2209/34; H04L 9/3231
USPC .......................................................... 382/124
See application file for complete search history.

(56) References Cited

U.S. PATENT DOCUMENTS 6,757,410 B1    6/2004  Nakashima

FOREIGN PATENT DOCUMENTS

| CN | 101582114 A | 11/2009 |
| TW | I298852 | 7/2008 |
| TW | 200937259 A | 9/2009 |

OTHER PUBLICATIONS

Athos Antonelli et al, "Fake Finger Detection by Skin Distortion Analysis" Published in IEEE Transactions on Information Forensics and Security, vol. 1, No. 3, Sep. 2006; pp. 360-373.†

† cited by third party

*Primary Examiner* — Manuchehr Rahmjoo
(74) *Attorney, Agent, or Firm* — Muncy, Geissler, Olds & Lowe, P.C.

(57) ABSTRACT

A fake finger discrimination device includes a fingerprint sensor and a control processor. The fingerprint sensor senses a rotating finger to obtain fingerprints in a fake finger discrimination mode. The control processor electrically connected to the fingerprint sensor, judges whether the fingerprints match with one another by way of rotation correlation comparison. If the fingerprints match with one another, the finger is determined as true. If the fingerprints do not match with one another, the finger is determined as fake. A fake finger discrimination method is also disclosed.

18 Claims, 5 Drawing Sheets

FAKE FINGER DISCRIMINATION DEVICE AND METHOD

CROSS-REFERENCE TO RELATED APPLICATION

This application claims priority from Taiwan Patent Application No. 102146506, filed on Dec. 17, 2013, in the Taiwan Intellectual Property Office, the content of which are hereby incorporated by reference in their entirety for all purposes.

BACKGROUND OF THE INVENTION

1. Field of the Invention

The present invention relates to a fake finger discrimination device and method, in particular concerning about a fake finger discrimination device and method by using rotation of a finger.

2. Description of the Related Art

Fingerprints, which are personal biological features, are used to identify personal identity. In recent years, as the digital products have been burgeoning widely, fingerprint identification, which is served as individual authentication, has caused attention. Because fingerprints are characterized of difference from person to person along with permanency, the fingerprint identification has been regarded as having better reliability and convenience.

In the meanwhile, it has to avoid immoral behaviors occurring in the fingerprint identification. For example, someone may counterfeit one's fingerprint to pretend being the person. Although the conventional art can be used to identify fake fingers by detecting surface colors, electrical features of fingers or sweat pore thereof, the existing copying skills become more and more advanced and are able to duplicate the preceding biological characteristics. Additionally, appending another person's copied fingerprint including transparent or skin color thin film to finger's surface will cause that the fake finger is hard to be recognized.

SUMMARY OF THE INVENTION

Therefore, one purpose of the present invention is to provide a fake finger discrimination device and method, in particular concerning about a fake finger discrimination device and method by using torsional force caused by rotating fingers.

In order to reach to the aforementioned purpose, the present invention may provide a fake finger discrimination device comprising a fingerprint sensor and a control processor. The fingerprint sensor may sense a rotating finger to obtain fingerprints in a fake finger discrimination mode, and the control processor may be electrically connected to the fingerprint sensor to judge whether the fingerprints match with one another by way of rotation correlation comparison, Wherein, if the fingerprints match with one another, the finger may be determined as true, and if the fingerprints do not match with one another, the finger may be determined as fake.

The present invention may further provide a fake fingerprint discrimination method which is applicable to a fake fingerprint discrimination device comprising a fingerprint sensor and a control processor electrically connected to the fingerprint sensor. The method may comprise steps as follows: sensing a rotating finger in a fake fingerprint discrimination mode to obtain fingerprints by the fingerprint sensor; and judging whether the fingerprints match one another by way of rotation correlation comparison; wherein if the fingerprints match with one another, the finger may be determined as true, if the fingerprints do not match with one another, the finger may be determined as fake.

By means of a fake finger discrimination device and method of the present invention, it may reach to the function of discriminating fake fingers without modifying structure of fingerprint sensor by using scheme of the control processor. It may contribute to the usage that the traditional electronic devices may also be able to add the function of fake finger discrimination without changing hardware design and only may need to update firmware or software.

Hereinafter, embodiments of the present invention will be described in detail with reference to the accompanying drawings so that those skilled in the art to which the present invention pertains can realize the present invention.

DETAILED DESCRIPTION OF THE PREFERRED EMBODIMENTS

The distinguishing feature of embodiment of the present invention is to make use of the principle concerning that true finger's fingerprint is characterized of flexibility and toughness which is not distorted and deformed due to random press and rotation, and fake one, to the contrary, is distorted and deformed due to random press and rotation. Because fake finger or fake finger thin film, which is made of traditional soft materials, such as silicone . . . etc., is incapable of enduring torsional force caused by finger pressing and rotating on a sensing surface. Consequently, fake finger is easy to be recognized in the detection mode.

Figure 1:
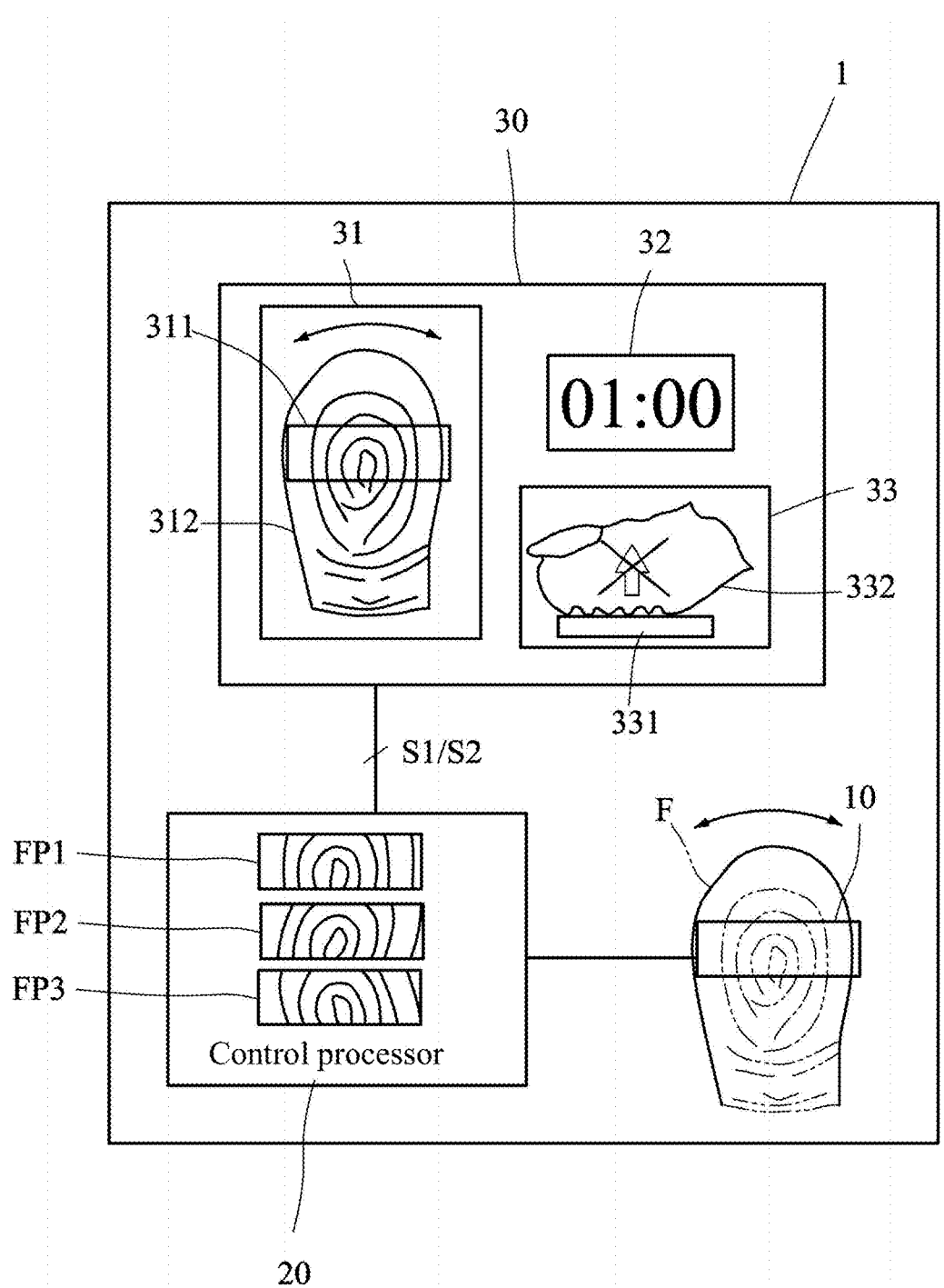
FIG. 1 is a schematic diagram of a preferred embodiment of a fake finger discrimination device according to the present invention.

FIG. 1 is a schematic diagram of a preferred embodiment of a fake finger discrimination device 1 according to the present invention. As FIG. 1 shows, the fake finger discrimination device 1 is suitable for being applied to electronic devices, such as cell phone, tablet PC, laptop, identity recognition device, access control management device and so on. The fake finger discrimination device 1 comprises a fingerprint sensor 10 and a control processor 20.

The fingerprint sensor 10 senses a rotating finger in a fake finger discrimination mode to obtain fingerprints FP1 to FP3. The fingerprint sensor 10 can be a full-area fingerprint sensor, a small-area fingerprint sensor or a sliding fingerprint sensor. A full-area fingerprint sensor senses desired fingerprints which are the fingers in static status by one frequency, a small-area fingerprint sensor senses desired fingerprints which are the fingers in static status by several frequencies and a sliding fingerprint sensor senses desired fingerprints of which the fingers slide thereon by several frequencies. The sensing principle of the fingerprint sensor 10 comprises optical, capacitive and thermal sensing types, but it shall not subject to this restriction.

The control processor 20 is electrically connected to the fingerprint sensor 10 and judges whether the fingerprints FP1 to FP3 match with one another by way of rotation correlation comparison. The so-called rotation correlation comparison is to compare the sensed fingerprint images FP1 to FP3 (the present invention is not restricted by three fingerprints) or specific features after them are rotated. If the fingerprints FP1 to FP3 match with one another, the control processor 20 determines that the finger F is a true finger; if the fingerprints FP1 to FP3 do not match with one another, the control processor 20 determines that the finger F is a fake finger. For example, the fingerprint FP1, which is a fingerprint of true finger, is not rotated yet, fingerprint FP2, which is a fingerprint of true finger, is rotated clockwise, and fingerprint FP3, which is a fingerprint of true finger, is rotated anticlockwise. The three fingerprints FP1 to FP3 match with one another after being rotated. The control processor 20 judges whether the fingerprints FP1 to FP3 match with one another by judging whether images of the fingerprints FP1 to FP3 or features of the fingerprints FP1 to FP3 match with one another.

In addition, the fake finger discrimination device 1 further comprises a man-machine interface 30, such as a displayer or a speaker, electrically connected to the control processor 20 to receive an indication signal S11 output by the control processor 20 to notify a user of entering the fake finger discrimination mode and to indicate the user's finger being not able to leave the fingerprint sensor 10 in process of rotating via ways of screen or audio to achieve effects of notification and indication. In order to reduce the burden of calculation, the indication signal S1 contains indication of rotation direction. Consequently, the man-machine interface 30 notifies the user of rotating the finger F clockwise and anticlockwise according to the indication signal S1, and the rotation correlation comparison is conducted based on the indication signal S1.

The reason for why the finger F is not allowed to leave the fingerprint sensor 10 in process of rotating is because the user may prevent the fingerprint image of fake finger from being distorted due to press and rotation so that to leave the finger out of the sensing surface of the fingerprint sensor temporarily, and then put it down. Although the control processor 20 can obtain fingerprints by way of that, it causes misjudgment; the limitation condition is therefore added. Consequently, the control processor 20 further judges whether the finger F leaves the fingerprint sensor 10 according to the fingerprints FP1 to FP3. If the finger F leaves the fingerprint sensor 10, a re-sense signal S2 is output to the fingerprint sensor 10 to notify the fingerprint sensor 10 of re-conducting fingerprint sensing or the finger is determined as fake directly, or after more than one predetermined frequency (number of times are not limited by 3, 4 or 5) of the re-sense signal S2 is output, the finger F is determined as fake. Under the circumstances, if the finger F leaves the fingerprint sensor 10, the control processor 20 further outputs the re-sense signal S2 to the man-machine interface 30 to notify the user of re-conducting fingerprint sensing or determine that the finger F is fake directly, or after more than one predetermined frequency of the re-sense signal S2 is output, the finger F is determined as fake.

Additionally, the control processor 20 further judges whether the finger F completes a rotation within a predetermined time; if not, the re-sense signal S2 is output to the fingerprint sensor 10 to notify the fingerprint sensor 10 of re-conducting fingerprint sensing or the finger F is determined as fake directly, or after more than one predetermined frequency of the re-sense signal S2 is output, the finger F is determined as fake. This is because the fake finger is of stickiness so that cannot be rotated rapidly. Therefore, a predetermined time can be preset in the control processor 20, and the predetermined time is preferably smaller or equal to a half second, or more preferably, smaller or equal to one third second. Namely, more than two or three different fingerprints are captured in a second, or more preferably, the predetermined time is between 0.25 second and 1 second.

In the preceding description, it only states the operating method of entering the fake finger discrimination mode, and the fake finger discrimination device 1 is absolutely capable of entering the fingerprint sensing mode which rotating user's finger is unnecessary. In order to reduce the detection disturbance to user, the fingerprint sensing mode and the fake finger discrimination mode can be combined to conduct sensing the fingerprint and recognizing the finger simultaneously. For example, the fingerprint FP1 is served as the fingerprint obtained in fingerprint sensing mode, and fingerprints FP1 to FP3 are regarded as the fingerprints obtained in the fake finger discrimination mode.

In the present embodiment, the man-machine interface 30 is taken as an example. The man-machine interface 30 shows a first indication screen 31, and the first indication screen 31 contains a sensor pattern 311 and a finger pattern 312 which are used to notify the user of rotating the finger clockwise and/or anticlockwise. The man-machine interface 30 also shows a second indication screen 32 which displays a remaining time message, such as 01:00 means a second, and then count-down is shown, so that the user completes the finger's rotation in a second. The man-machine interface 30 also shows a third indication screen 33 containing a sensor pattern 332 and a finger pattern 331 which are used to indicate the finger F of the user being not able to leave the fingerprint sensor 10 in process of rotating.

Figure 2:
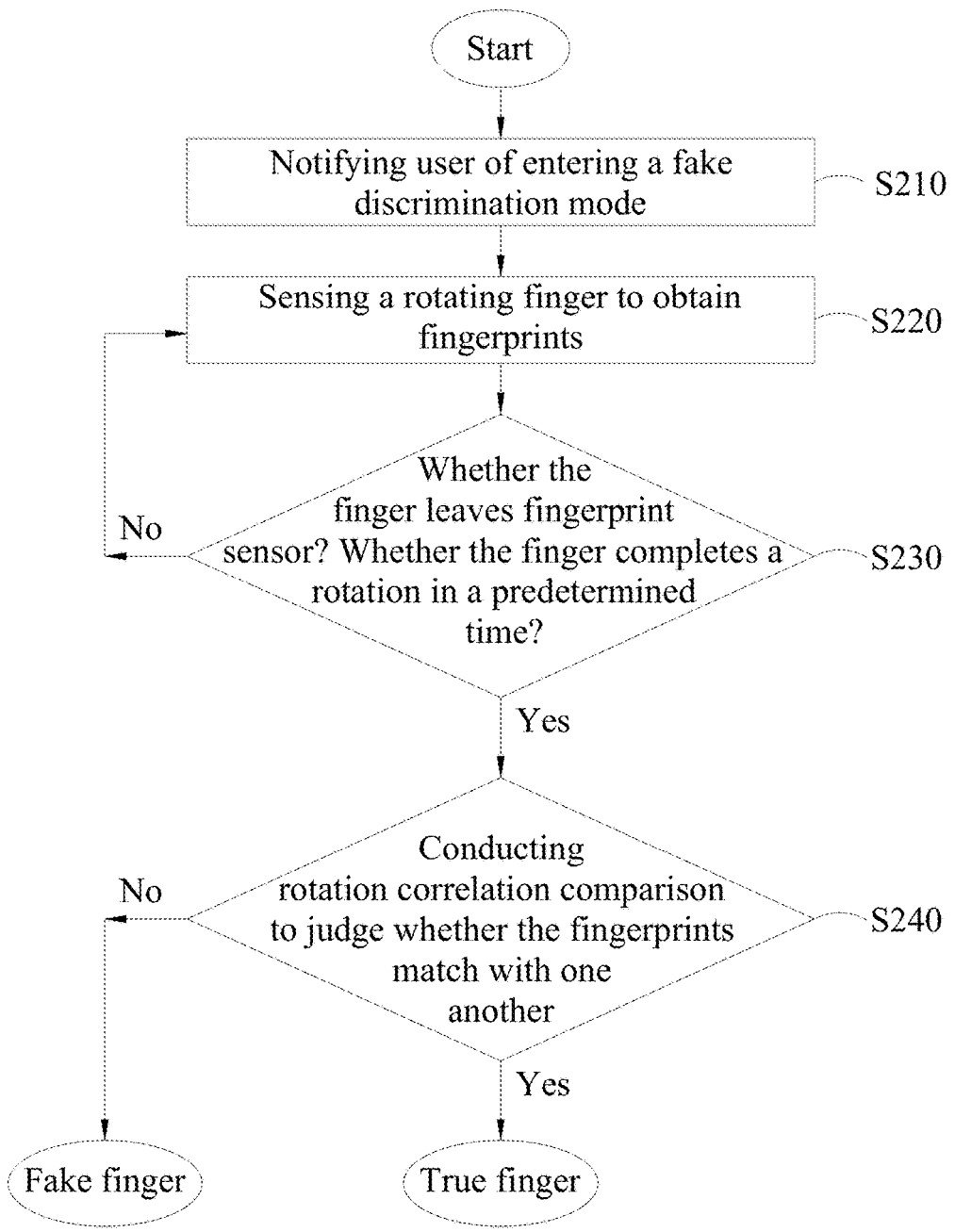
FIG. 2 is a flow chart of a preferred embodiment of a fake finger discrimination method according to the present invention.

FIG. 2 illustrates a flow chart of a preferred embodiment of a fake finger discrimination method according to the present invention. As FIG. 2 shows, a fake finger discrimination method which is applicable to the fake finger discrimination device 1 comprises the following steps.

Firstly, step S210 shows receiving the indication signal S1 output by the control processor 20 to notify the user of entering the fake finger discrimination mode by the man-machine interface 30, and indicate the user's finer being not able to leave the fingerprint sensor 10 simultaneously. Next, Step S220 shows sensing the rotating finger F to obtain fingerprints in the fake finger discrimination mode, and then step S230 shows judging whether the finger F leaves the fingerprint sensor 10 according to the fingerprints FP1 to FP3 by the control processor 20, and/or determining whether the finger F completes the rotation in a predetermined time. If the finger F leaves the fingerprint sensor 10, and/or the finger F does not complete the rotation within the predetermined time, the re-sense signal S2 is output to the fingerprint sensor 10 to notify the fingerprint sensor 10 of re-conducting fingerprint sensing, or after more than one predetermined frequency of the re-sense signal S2 is output, the finger F is determined as fake.

Subsequently, step S240 shows judging whether the fingerprints FP1 to FP3 match with one another via way of the rotation correlation comparison by the control processor 20; if the fingerprints FP1 to FP3 match with one another, the finger is determined as true; if the fingerprints FP1 to FP3 do not match with one another, the finger is determined as fake.

As to any explanations of the fake finger discrimination device in reference diagram 1, they are all suitable for being applied to the fake finger discrimination method; unnecessary details are therefore no longer given.

Figure 3:
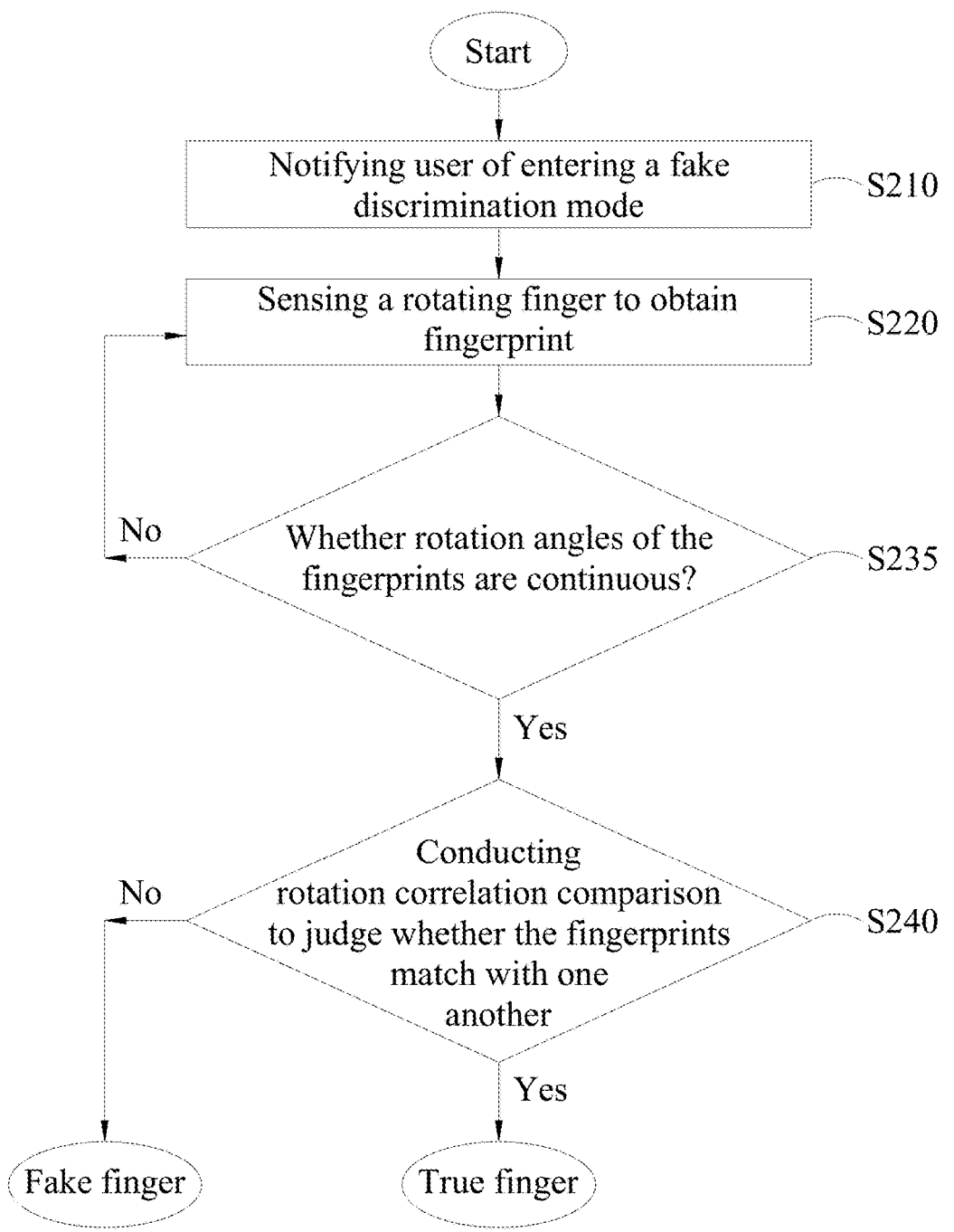
FIG. 3 is a flow chart of another embodiment of a fake finger discrimination method according to the present invention.
Figure 4A:
FIGS. 4A to 4D show the examples of fingerprint images of true fingers.
Figure 4B:
Figure 4C:
Figure 4D:
Figures 5A, 5B:
FIGS. 5A to 5D show the examples of fingerprint images of fake fingers.
Figures 5C, 5D:

FIG. 3 is a flow chart of another embodiment of a fake finger discrimination method according to the present invention. As FIG. 3 shows, the embodiment is akin to FIG. 2, and what the difference is that step S230 in FIG. 2 is replaced by step S235. In step S235, the control processor 2 further judges whether rotation angles of the fingerprints FP are continuous; if not, the re-sense signal S2 is output to the fingerprint sensor 10 to notify the fingerprint sensor 10 of re-conducting the fingerprint FP sensing, or the finger F is determined as fake. This is because when a true finger is rotating, the fingerprint sensor 10 obtains fingerprint images of continuous rotation within a predetermined time, this is, the rotation angles of the fingerprints FP are continuous, and the sequence, for example, is 10, 11, 12, 13, 14, 15, 16 and 17 degree. When the fake finger is rotating, as the surface thereof is of stickiness which causes the rotation is not smooth, and hence, the fake finger is hard to rotate without leaving the sensing surface of the fingerprint sensor 10, resulting that the fingerprint images of continuous rotation angles are not able to be generated within a continuous time. Namely, the rotation angles of the fingerprints FP are therefore continuous, and the sequence, for example, is 10, 11, 12, 13, 14, 15, 16 and 17 degree that cause a severe fall of level.

FIGS. 4A to 4D show the examples of fingerprint images of true fingers. The fingerprints shown in FIGS. 4A to 4D are obtained by rotating finger anticlockwise which can be seen that belong to continuous rotation angles, and the fingerprints have no adhesive situation due to rotation, and can thereby be confirmed that match with one another by way of the rotation correlation comparison. FIGS. 5A to 5D show the examples of fingerprint images of fake fingers. The fingerprints shown in FIGS. 5A to 5D are obtained by rotating finger anticlockwise which can be seen that not belong to continuous rotation angles, and the fingerprints have adhesive situation due to rotation, and cannot thereby be confirmed that match with one another by way of the rotation correlation comparison. Therefore, the result proves that the fake finger discrimination device and method of the present invention are of practicability.

By means of a fake finger discrimination device and method of the present invention, it can reach to the function of discriminating fake fingers without modifying structure of fingerprint sensor by using scheme of the control processor. It contributes to the usage that the traditional electronic devices are also able to add the function of fake finger discrimination without changing hardware design and only need to update firmware or software.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A fake finger discrimination device, comprising:
   a fingerprint sensor sensing a rotating finger to obtain fingerprints with different rotating angles of the rotating finger in a fake finger discrimination mode through a single rotation of the rotating finger clockwise and/or anticlockwise without the rotating finger separating from the fingerprint sensor; and
   a control processor electrically connected to the fingerprint sensor to judge whether one of the fingerprints of the single rotation matches another fingerprint by way of rotation correlation comparison, wherein the rotation correlation comparison is to compare the fingerprints with different rotating angles of the rotating finger;
   wherein if one of the fingerprints matches another fingerprint by way of the rotation correlation comparison, the finger is determined to be true, otherwise the finger is determined to be fake.

2. The fake finger discrimination device as defined in claim 1, further comprising:
   a man-machine interface electrically connected to the control processor to receive an indication signal output by the control processor to notify a user of entering the fake finger discrimination mode and indicate the finger of the user being not able to leave the fingerprint sensor in process of rotating.

3. The fake finger discrimination device as defined in claim 2, wherein the man-machine interface notifies the user of rotating the finger clockwise and anticlockwise according to the indication signal, and the rotation correlation comparison is conducted based on the indication signal.

4. The fake finger discrimination device as defined in claim 1, wherein the control processor further judges whether the finger leaves the fingerprint sensor according to the fingerprints; if the finger leaves the fingerprint sensor, a re-sense signal is output to the fingerprint sensor to notify the fingerprint sensor of re-conducting fingerprint sensing or determine the finger to be fake.

5. The fake finger discrimination device as defined in claim 4, further comprising:
   the man-machine interface electrically connected to the control processor to receive the indication signal output by the control processor to notify a user of entering the fake finger discrimination mode and indicate the finger of the user being not able to leave the fingerprint sensor in process of rotating; wherein if the finger leaves the fingerprint sensor, the control processor outputs the re-sense signal to the man-machine interface to notify the user of re-conducting fingerprint sensing.

6. The fake finger discrimination device as defined in claim 1, wherein the control processor judges whether one of the fingerprints matches another fingerprint by judging whether an image of the fingerprint matches that of another fingerprint, or whether features of the fingerprint match those of another fingerprint.

7. The fake finger discrimination device as defined in claim 1, wherein the control processor further judges whether the finger completes rotation in a predetermined time; if not, a re-sense signal is output to the fingerprint sensor to notify the fingerprint sensor of re-conducting fingerprint sensing or determine the finger to be fake.

8. The fake finger discrimination device as defined in claim 7, wherein the predetermined time is between 0.25 second and 1 second.

9. The fake finger discrimination device as defined in claim 1, wherein the control processor further judges whether rotation angles of the fingerprints are continuous; if not, a re-sense signal is output to the fingerprint sensor to notify the fingerprint sensor of re-conducting fingerprint sensing or determine the finger to be fake.

10. A fake fingerprint discrimination method applicable to a fake fingerprint discrimination device comprising a fingerprint sensor and a control processor, the method comprising steps as follows:

sensing a rotating finger with different rotating angles of the rotating finger in a fake fingerprint discrimination mode to obtain fingerprints by the fingerprint sensor through a single rotation of the rotating finger clockwise and/or anticlockwise without the rotating finger separating from the fingerprint sensor; and judging whether one of the fingerprints of the single rotation matches another fingerprint by way of rotation correlation comparison by the control processor; wherein the rotation correlation comparison is to compare the fingerprints with different rotating angles of the rotating finger;

wherein if one of the fingerprints matches another fingerprint by way of the rotation correlation comparison, the finger is determined to be true, otherwise the finger is determined to be fake.

11. The fake fingerprint discrimination method as defined in claim 10, further comprising:

receiving an indication signal output by the control processor to notify a user of entering the fake discrimination mode by a man-machine interface electrically connected to the control processor; and indicating the finger of the user being not able to leave the fingerprint sensor in process of rotating.

12. The fake fingerprint discrimination method as defined in claim 11, further comprising:

notifying the user of rotating the finger clockwise and anticlockwise according to the indication signal by the man-machine interface; and conducting the rotation correlation comparison according to the indication signal.

13. The fake fingerprint discrimination method as defined in claim 10, further comprising:

judging whether the finger leaves the fingerprint sensor according to the fingerprints by the control processor; and outputting a re-sense signal to the fingerprint sensor to notify the fingerprint sensor of re-conducting fingerprint sensing or determining the finger to be fake if the finger leaves the fingerprint sensor.

14. The fake fingerprint discrimination method as defined in claim 13, further comprising:

receiving an indication signal output by the control process to notify a user of entering the fake fingerprint discrimination mode by a man-machine interface electrically connected to the control processor;

indicating the finger of the user being not able to leave the fingerprint sensor in process of rotating; and outputting the re-sense signal to the man-machine interface to notify the user of re-conducting fingerprint sensing by the control processor if the finger leaves the fingerprint sensor.

15. The fake fingerprint discrimination method as defined in claim 10, further comprising:

judging whether one of the fingerprints matches another fingerprint by judging whether an image of the fingerprint matches that of another fingerprint, or whether features of the fingerprint match those of another fingerprint by the control processor.

16. The fake fingerprint discrimination method as defined in claim 10, further comprising:

judging whether the finger completes rotation in a predetermined time; if not, outputting a re-sense signal to the fingerprint sensor to notify the fingerprint sensor of re-conducting fingerprint sensing or determining the finger to be fake by the control processor.

17. The fake fingerprint discrimination method as defined in claim 16, wherein the predetermined time is between 0.25 second and 1 second.

18. The fake fingerprint discrimination method as defined in claim 10, further comprising:

judging whether rotation angles of the fingerprints are continuous; if not, outputting a re-sense signal to the fingerprint sensor to notify the fingerprint sensor of re-conducting fingerprint sensing or determining the finger to be fake by the control processor.

* * * * *